Patented June 17, 1941

2,245,567

UNITED STATES PATENT OFFICE 2,245,567

MANUFACTURE OF UNSATURATED KETONES

Joseph H. Brant and Rudolph Leonard Hasche, Kingsport, Tenn., assignors to Eastman Kodak Company, Rochester, N. Y., a corporation of New Jersey No Drawing. Application June 23, 1939, Serial No. 280,808

15 Claims. (Cl. 260—593)

This invention relates to the manufacture of unsaturated ketones and more particularly to the manufacture of aliphatic vinyl ketones such as methyl isopropenyl ketone, α-isopropyl vinyl methyl ketone, 2,3 diacetyl butadiene and others.

Some of the unsaturated ketones are known chemical compounds. Suggested methods of manufacture have included the use of alkali condensation agents, rather extended operations including first preparing the alcohol, the use of liquid phase conditions and other steps possessing certain disadvantages. For example, difficulty in the addition of one molecule as well as low yields are experienced when prior art procedure is attempted.

We have found a method for preparing vinyl ketones which represents a substantial improvement over prior art procedure. By vinyl ketones we refer to ketones containing the

groups. By our procedure such unsaturated ketones may be prepared in fewer steps and in substantial yields, from common readily available chemical compounds. In addition, a number of new vinyl ketones, not hitherto produced, may readily be prepared.

This invention has for one object to provide a method for manufacturing unsaturated ketones. A further object is a one-stage process for the reaction of formaldehyde with a ketone to form an unsaturated ketone substantially directly. A still further object of our invention is to produce an unsaturated ketone in which only one molecule of formaldehyde has been added to a ketone with a simultaneous splitting of water to give a vinyl group wherein the addition of a methylene group to the alpha carbon atom is caused to take place. Another object is the recovery of unsaturated ketone from the reaction mixture in the presence of the reaction constituents. Still another object is to provide a method for preparing unsaturated ketones which may be conducted largely or entirely in the vapor phase. Another object is to provide a catalytic process for the manufacture of unsaturated ketones. A still further object is to provide a process for the manufacture of unsaturated ketones which may be operated in a continuous manner, utilize high space velocity and give large apparatus capacity. Another object is to provide a method particularly adapted for the manufacture of methyl isopropenyl ketone. A still further object is to provide catalyst compositions particularly adapted for use in the manufacture of unsaturated ketones by our novel process. Other objects will appear hereinafter.

We have found that formaldehyde and one or more ketones (aliphatic or aromatic) may readily be reacted in the vapor phase, preferably in the presence of a catalyst and at temperatures greater than 210° C. and usually between about 250–400° C., to obtain an unsaturated ketone.

The reaction may be carried out in any suitable apparatus, for example, the apparatus might comprise either separate vaporizers or a combined vaporizer for both the ketone and aldehyde. The vaporizer arrangement chosen would be connected with a catalyst chamber containing catalyst of the character to be described in detail hereinafter. If desired, suitable provision for passing the incoming materials in heat exchange with the outgoing reaction products could be provided. The catalyst chamber would be connected in turn to a condenser and these units connected to distillation apparatus, polymerization equipment or other such units, depending upon the subsequent treatment which it is desired to apply to the unsaturated ketone produced.

In general, the reaction would be carried out somewhat as follows: A commercial source of an aldehyde, as for example formalin, is mixed with a ketone, as for example methyl ethyl ketone, and fed to a vaporizer maintained at about 250–270° C. The vapors pass directly from the vaporizer through the catalyst chamber over the catalyst bed which is maintained at 290–320° C. As will be described, a variety of catalysts may be employed. Among the preferred catalysts for this reaction are lead acetate, lead chromate and zinc or cadmium acetates. Space velocities greater than 600 are satisfactory. We define the space velocity as the volume in cu. ft. calculated at standard conditions of reactants and water vaporized per cu. ft. of catalyst per hour. It is usually preferred to use an excess of the ketone. In our vapor phase process for combining formaldehyde with a ketone, we have found it is advisable to react the formaldehyde completely. It is also not particularly convenient to recover formaldehyde from a dilute solution in water, hence, by using considerable molar excess of ketone as compared with formaldehyde, for instance a molar ratio of 4:1, we can react substantially all the formaldehyde. Also an excess of ketone allows internal temperature control for the exothermic reaction.

As already indicated, a number of catalysts have been found to be satisfactory in our process. Silica or alumina gel or comparable materials such as activated alumina are satisfactory. However, it is preferred to employ a composite catalyst comprising a material such as a gel, together with one or more metal salts or oxides.

In more detail, examples of preparing satisfactory catalysts are as follows:

To 140 cc. water was added 60 cc. glacial acetic acid. This solution was heated to about 50-60° C. and 60 g. of lead monoxide (PbO) was dissolved therein by adding the lead oxide in small portions. To this lead acetate solution was added 500 g. silica gel. Any excess liquid was removed by heating the silica gel either under a partial vacuum or in a slow stream of air.

This dried catalyst was then divided into three equal parts of about 225 g. each. Sample No. 1 was used as prepared and designated a lead acetate catalyst.

To sample No. 2 was added 50 cc. of an aqueous solution containing about 10 g. chromium trioxide. This converted the lead acetate to lead chromate. The excess liquid was again removed by heating. This catalyst was designated a lead chromate catalyst.

The third portion was treated with an aqueous sulfuric acid solution containing sulfuric acid somewhat in excess of the amount required to convert the lead acetate to lead sulfate.

It is to be understood that the preceding has been set forth merely for the purposes of illustration and not for limiting our invention. Other metal acetates, as for example magnesium and cadmium acetate could be employed or other oxides as tungsten or molybdenum oxides. It is also possible to employ oxides and salts of metals such as calcium, lead and zinc. In general, our catalyst may comprise dehydration materials either simple or composite, as for example, silica gel, impregnated with metal oxide or metal salt. By the term "gel" we refer to a variety of materials. The so-called commercial silica gel is made by a process wherein a mass that sets into a jelly-like material is obtained. This jelly-like material is washed and dried in a manner that it shrinks to about one-tenth its former volume and is a very hard dry solid. This product is composed of super-microscopic pores or capillaries. These capillaries are very absorptive and will take up vapors as much as 50% or more of its weight. This is due to the fact that any liquid in extremely fine capillary suffers a decrease in vapor pressure. The pores of the gel may be of the order of five millionths of a millimeter which is only a few molecular diameters. While it is relatively clear that our catalysts embrace such materials as silica gel or alumina gel, since they actually go through a gel stage in the preparation, our catalysts also embrace other materials having the same physical properties. For example, activated alumina is sometimes referred to as a gel and has comparable physical properties to silica gel respecting absorptive characteristics and the like. However, activated alumina does not pass through the gel stage during its method of preparation. Likewise, materials comprising hydrated sodium, aluminum, silicates, are satisfactory catalysts in our process.

In other words, our catalysts may embrace a variety of very high absorptive materials which materials may contain oxides and salts of metal such as sodium, calcium, lead, zinc, chromium and manganese. Since one distinctive property of the so-called activated or absorptive catalyst is that they are dehydration catalysts, for convenience herein, we may designate our catalysts as dehydration catalysts. In other instances, we may define our catalysts as impregnated catalysts or gel catalysts.

The following example is set forth to illustrate our process in further detail and for setting forth a specific embodiment. Hence, it is to be understood that our invention is not to be specifically limited thereby.

The catalyst unit was filled with approximately 250 cc. of the lead acetate catalyst described above. The feed composition was approximately 80 grams of formalin (36% formaldehyde) and 430 grams of methyl ethyl ketone. The ketone-aldehyde mixture was fed to the vaporizer at the rate of about 4-5 cc. per minute. The vaporizing temperature was kept at about 240°-250° C. The vaporized feed passed directly to the catalyst unit and over the catalyst which was maintained at about 280-295° C. The gases leaving the catalyst unit were quickly cooled and condensed.

From the aforementioned run about 73 grams of methyl isopropenyl ketone were obtained. This represents a yield of about 85% based on the formaldehyde used. It is preferred to employ somewhat of an excess of methyl ethyl ketone whereby the formaldehyde is more completely converted. The unreacted constituents may be conducted to recovery processes, recycled or otherwise utilized. The products obtained in this example have the formula:

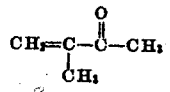

Several additional runs similar to the aforementioned were carried out but the lead acetate catalyst was replaced by other catalysts above described, such as commercially obtainable silica or alumina gels as well as these and other materials impregnated with heavy metal salts.

Likewise, several runs were carried out wherein formaldehyde was reacted with ketones other than methyl ethyl ketone, and also in the presence of different catalysts. Both aromatic and aliphatic ketones were reacted with formaldehyde.

While we have indicated in many examples the reaction of saturated aliphatic ketones, we have found that mixed aliphatic aromatic ketones exemplified by acetaphenone, reacts with formaldehyde to form the corresponding mixed aliphatic aromatic unsaturated ketones.

The following are equations illustrating some of the reactions and examples which were carried out. The equations indicate the structure of the unsaturated ketones obtained:

Example I

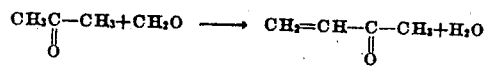

*Methyl vinyl ketone*

393 g. Formalin (34.2% CH₂O), 4.5 mols.
783 g. acetone, 13.5 mols. 4:1 ratio.
Vaporizer temp. 280-300° C.
Catalyst temp. 280-298° C.
Yield on CH₂O added=60.1%.
Catalyst=lead catalytic zeolite (untreated), 250 cc.

EXAMPLE II

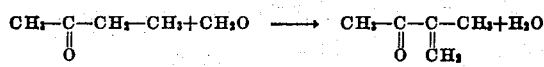

Methyl isopropenyl ketone 393 g. Formalin (34.2% CH$_2$O), 4.5 mols.
1269 g. methyl ethyl ketone, 13.5 mols. 4:1 ratio.
Vaporizer temp.=275–305° C.
Yield on CH$_2$O added=68.9%.
Catalyst=lead catalytic zeolite (untreated), 250 cc.

EXAMPLE III

Methyl isopropenyl ketone

Feed—same—4 to 1 ratio (30.2 mols CH$_2$O as Formalin).
Feed rate 2223 cc./hr.
Vap. temp. 320–325° C.
Cat. temp. 275–300° C.
Yield on CH$_2$O fed—97.4%.
Catalyst, 1800 cc. lead catalytic zeolite (untreated), 1800 cc.

EXAMPLE IV

Methyl isopropenyl ketone 1269 g. methyl ethyl ketone.
402 g. Formalin, 4.5 mols.
Vap. temp.=245–255° C.
Cat. temp.=280–300° C.
Yield on CH$_2$O fed=40.2%.
Catalyst, 250 cc. zinc catalytic zeolite (untreated).

EXAMPLE V

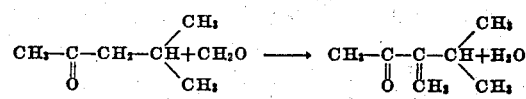

Alpha isopropyl vinyl methyl ketone
(2-methyl-3-methylene pentanone-4)

1200 g. methyl iso butyl ketone, 12 mols.
256.6 g. Formalin (34.83% CH$_2$O)=2.98 mols.
+190 cc. Methanol, 4:1 ratio.
Vap. temp.=275–300° C.
Cat. temp.=265–305 (mostly 288–290° C.).
Unsaturated ketone made=289.5 g.
Yield on CH$_2$O fed=86.6%.
Cat. temp.=265–305 (mostly 288–290° C.).

EXAMPLE VI

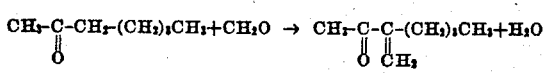

Alpha-N-butyl vinyl methyl ketone
(5-methylene heptanone-6)

684 g. methyl n-amyl ketone, 6 mols.
128.3 g. Formalin (34.82% CH$_2$O)=1.49 mols.
Vap. temp. 274–298° C.
Unsaturated ketone made=163 g.
Yield on CH$_2$O fed=87.5%.
Catalyst, 250 cc. (light) lead zeolite.

EXAMPLE VII

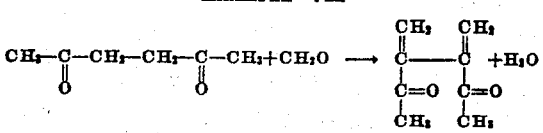

2,3-diacetyl butadiene-1,3

684 g. acetonyl acetone, 6 mols.
256.6 g. Formalin (34.82% CH$_2$O)=2.98 mols.
Vap. temp. 270–305° C.
Cat. temp. 260–318° C.

Unsaturated ketone made=159.8 g.
Yield on CH$_2$O added=28.9%.
Catalyst=250 cc. (light) lead zeolite.
The reaction producing 2,3-diacetyl propene-1 is as follows:

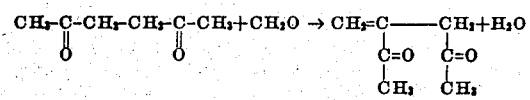

EXAMPLE VIII

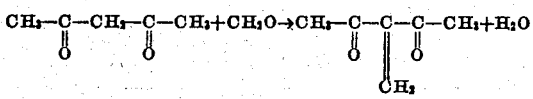

Alpha acetyl vinyl methyl ketone
(3-methylene pentadione-2-4)

600 g. acetyl acetone=6 mols.
129.3 g. Formalin (34.82% CH$_2$O)=1.5 mols.
Vap. temp. 260–305° C.
Cat. temp. 275° C.
Unsaturated ketone made=169 g.
Yield on CH$_2$O added, 100%.
Catalyst=250 cc. light lead zeolite.

EXAMPLE IX

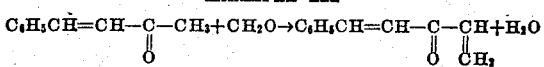

Beta-phenyl divinyl ketone
(1-phenyl pentadiene-1-5-one-3)

438.6 g. benzal acetone=3 mols.
129.3 g. Formalin (34.82% CH$_2$O)=1.5 mols.
Vap. temp. 270° C.–310° C.
Cat. temp. 280–317° C.
Catalyst=250 cc. lead zeolite.
Yield on CH$_2$O added, 40%.

EXAMPLE X

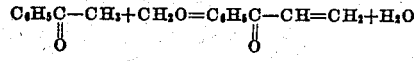

Phenyl vinyl ketone 360 g. acetophenone=3 mols.
258.6 g. 34.82% Formalin=3 mols.
Vaporizer temp. 250°–280° C.
Cat. temp. 290° C.–310° C.
Unsaturated ketone (phenyl-vinyl ketone) made 308 g.
Yield on CH$_2$O added 77.5%.

In the event that higher boiling point ketones are employed, higher vaporization temperatures and the like could be employed. The products (unsaturated ketones) produced by our reaction may be used in a number of ways as for example denaturants, polymerization, production of resins and for other purposes.

The time during which the reaction of the examples was carried out varied between about 1 and 7 or 8 hours.

While some of the compounds we have produced by our process are known compounds, we have found that our process is particularly adaptable for the production of new compositions of matter. For example, some of the new compositions of matter which we have produced are α-isopropenyl vinyl methyl ketone, alpha-n-butyl vinyl methyl ketone, 2,3-diacetyl butadiene-1,3, 2,3-diacetyl propene-1, α-acetyl vinyl methyl ketone and β-phenyl divinyl ketone.

It is apparent from the foregoing that our invention is susceptible of some modification and is not to be restricted excepting insofar as is necessitated by the prior art and the spirit of the appended claims.

What we claim and desire to be secured by Letters Patent of the United States is:

1. A process for the reaction of at least one ketone with another material essentially comprising formaldehyde which comprises preparing a vaporous mixture of the ketone and the other material, reacting the mixture in the presence of a highly absorptive substantially solid material as a catalyst, conducting the reaction at temperatures greater than 200° C. but less than 800° C. and cooling the resultant reaction materials containing unsaturated ketone.

2. A process for the reaction of a ketone having from 3 to 8 carbon atoms in the molecule with formaldehyde, which comprises preparing a vaporous mixture of the ketone and aldehyde, reacting the mixture in the presence of a dehydration catalyst and at temperatures greater than 200° C. but less than 600° C. and cooling the resultant reaction gases containing unsaturated ketone.

3. A process for the reaction of ketone with an aldehyde material essentially of formaldehyde which comprises preparing a vaporous mixture of the ketone and aldehyde, reacting the mixture in the presence of a gel dehydration catalyst, and at temperatures greater than 200° C. but less than 600° C. and cooling the resultant reaction gases containing unsaturated ketone.

4. A process for the reaction of ketone with formaldehyde which comprises preparing a vaporous mixture of the ketone and aldehyde, reacting the mixture in the presence of an impregnated dehydration catalyst, and at temperatures greater than 200° C. but less than 600° C. and condensing the resultant reaction gases containing unsaturated ketone.

5. A process for reacting ketones and aldehydes, which comprises obtaining a vaporous mixture having a substantial content of said ketone and a lower aldehyde which will react with the ketone contacting the vaporous mixture with a dehydration catalyst which promotes the reaction of ketone and aldehyde at a temperature greater than 220° C. and less than 400° C. and at space velocities between approximately 600–1800, and recovering unsaturated ketone from the reaction products.

6. A process for reacting ketones and aldehydes, which comprises obtaining a vaporous mixture having a substantial content of said ketone and contacting the vaporous mixture with a dehydration catalyst which promotes the reaction of ketone and aldehyde at a temperature greater than 220° C. and less than 400° C. and at space velocities between approximately 600–1800, and recovering unsaturated ketone from the reaction products.

7. A process for reacting ketones and aldehydes, which comprises obtaining a vaporous mixture having a substantial content of said ketone and contacting the vaporous mixture with an impregnated gel dehydration catalyst which promotes the reaction of ketone and aldehyde at a temperature greater than 220° C. and less than 400° C. and at space velocities between approximately 600–1800, and recovering unsaturated ketone from the reaction products.

8. A process for the manufacture of vinyl ketones, which comprises reacting a saturated aliphatic ketone with formaldehyde at temperatures greater than 200° C. and cooling the reaction products obtained.

9. A process for the manufacture of vinyl ketones which comprises catalytically reacting saturated aliphatic ketone and formaldehyde at a temperature greater than 200° C. and recovering at least a part of the vinyl ketone from the reaction products.

10. A process for the manufacture of a vinyl ketone, which comprises reacting methyl ethyl ketone and formaldehyde in the vapor phase at a temperature greater than 250° C. in the presence of a dehydration catalyst to obtain a reaction mixture containing said vinyl ketone and cooling the reaction mixture.

11. A chemical compound having the structure:

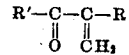

wherein R represents a radical from the group consisting of hydrogen, an acetyl group, a ketonic group and an alkyl group having at least 4 carbon atoms and R' represents a radical from the group consisting of an alkyl group and an aryl group having more than 6 carbon atoms.

12. A compound having the structure:

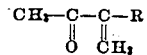

where R represents a radical from the group consisting of hydrogen, an acetyl group, a ketonic group and an alkyl group having at least 2 carbon atoms.

13. The composition of matter α-isopropyl vinyl methyl ketone.

14. The composition of matter α-N-butyl vinyl methyl ketone.

15. The composition of matter α-acetyl vinyl methyl ketone.

JOSEPH H. BRANT.
RUDOLPH LEONARD HASCHE.